Patented July 24, 1928.

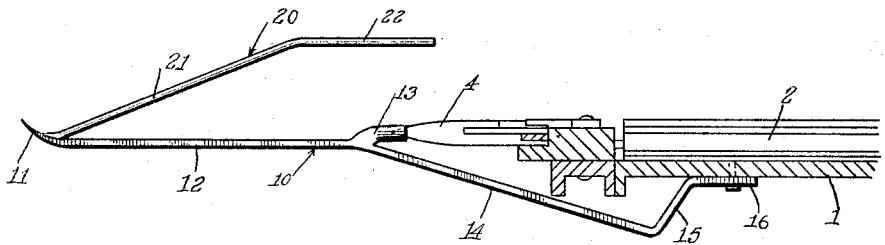
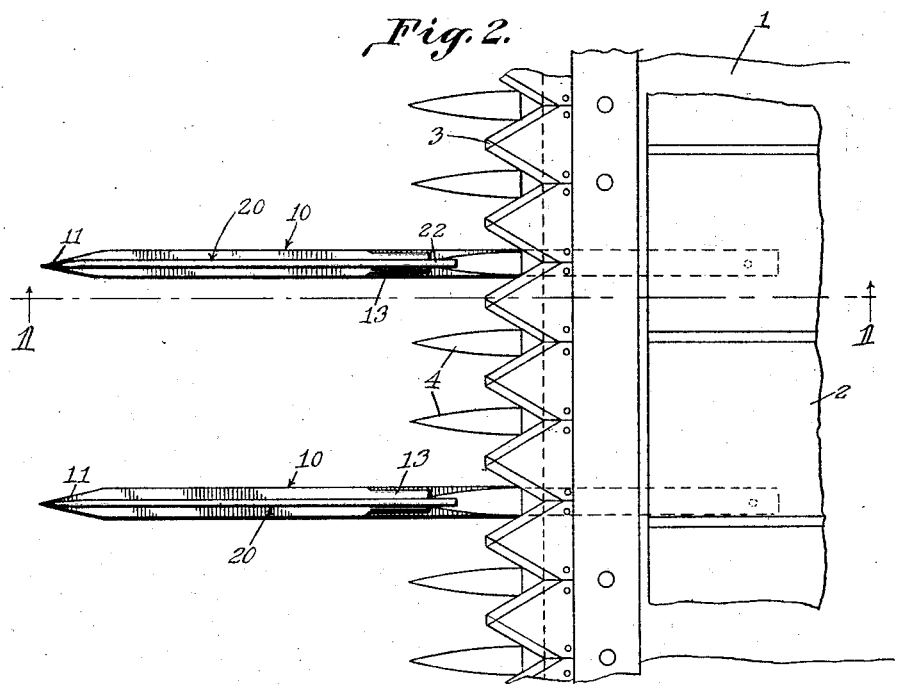

1,678,549

UNITED STATES PATENT OFFICE.

PETER H. BERGEN, OF GOESSEL, KANSAS.

PICK-UP GRAIN GUARD.

Application filed April 10, 1925. Serial No. 22,147.

This invention relates to grain binders and more particularly to grain lifting attachments for said binders.

The object of the invention is to provide a simple and efficient lifting attachment for grain binders which provides for the successful reaping of grain which has become flattened and tangled from rains or wind.

Another object is to so construct a pick-up grain guard of this character that an effective lifting of the grain will be accomplished and the reel prevented from hitting the guard.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a central vertical longitudinal section taken on the line 1—1 of Fig. 2; and Fig. 2 is a plan view of a portion of the platform of the binder showing this attachment mounted thereon.

In the embodiment illustrated a binder platform 1 is shown having the usual carrier apron 2 and the usual reciprocating knife 3 and sickle guard 4.

The grain lifting attachment constituting this invention comprises a flat milled steel bar 10 preferably about five-sixteenths of an inch thick and an inch and a quarter wide which is pointed at its front end as shown at 11 and the portion 12 arranged substantially in alinement with the platform being provided at the end of said portion with a guard fastener socket 13 which is located about midway the length of the bar. From the socket 13 the bar is inclined downwardly and rearwardly for a portion of its length as shown at 14 and then has an upwardly off set 15 with a straight rear portion 16 apertured for connection to the platform of the binder.

A lifting rod 20 is secured at its front end to the upper face of bar 12 at the pointed end thereof. This rod 20 is inclined upwardly and rearwardly for a portion of its length as shown at 21 and is then extended straight as shown at 22 and terminates in a plane slightly in rear of that occupied by the socket 13. This formation of the lifting rod adapts it to efficiently lift the grain and also prevents the binding reel, not shown, from hitting the guard.

The socket 13 which is adapted to receive the point of the sickle guard 4 is welded to the bar 12 and in connection with the apertured end of bar 12 forms a two-point securing means for the attachment so that the same will not be easily displaced.

By terminating the carrier rod 20 in a plane slightly in rear of the socket 13 all danger of the reel hitting the bar is prevented and the reel is designed to cooperate therewith for throwing the grain off the platform.

In operation when it is desired to use this attachment on a binder, where the grain to be reaped has been flattened by rain or wind, a plurality of these attachments are placed on the binder and laterally spaced relative to one another as clearly shown in Fig. 2 of the drawings. These attachments are preferably spaced about twelve inches apart or one attachment to every third guard. When so positioned the attachments will project forward in front of the binder and the upwardly inclined pointed ends thereof will be positioned a short distance from the ground so that they will engage and lift all of the grain that has been beaten down and lies close to the ground. When engaged by the forward end of the attachment the grain will be carried along by the carrier bar 20 as the binder moves forward and consequently the grain will be moved rearwardly until it may be easily cut by the reciprocating knife 3 and carried to the rear by means of the reel.

These attachments form an easy and simple means for lifting flat grain and may be secured and removed very easily.

I claim:—

In combination with a grain binder, the binder platform and the cutter bar thereof, a pick-up guard embodying a substantially wide bar having its forward extremity tapered and extended upwardly, a rod secured to the forward end of the bar and extending upwardly and laterally, the free end of the rod overlying the cutter bar, a socket member connected with the substantially wide bar and extended rearwardly to fit over the guard of the cutter bar, said substantially wide bar extending downwardly from the socket member to a point beyond the point of connection between the platform and cutter bar, where the substantially wide bar extends upwardly and laterally engaging the under surface of the platform, and means for securing the laterally extended portion to the platform.

In testimony that I claim the foregoing as my own, I have hereto affixed my signature.

PETER H. BERGEN.